J. Q. BRYER.
Wheels for Vehicles.

No. 141,111. Patented July 22, 1873.

WITNESSES.
E. T. Bates.
Chas. B. Steele

INVENTOR.
Joseph Q. Bryer,
Chipman Hosmer & Co.
attys

UNITED STATES PATENT OFFICE.

JOSEPH Q. BRYER, OF WILMINGTON, DELAWARE.

IMPROVEMENT IN WHEELS FOR VEHICLES.

Specification forming part of Letters Patent No. 141,111, dated July 22, 1873; application filed February 8, 1873.

*To all whom it may concern:*

Be it known that I, JOSEPH Q. BRYER, of Wilmington, in the county of New Castle and State of Delaware, have invented a new and valuable Improvement in Wheel-Hubs; and I do hereby declare that the following is a full, clear, and exact description of the construction and operation of the same, reference being had to the annexed drawings making a part of this specification and to the letters and figures of reference marked thereon.

Figure 1:
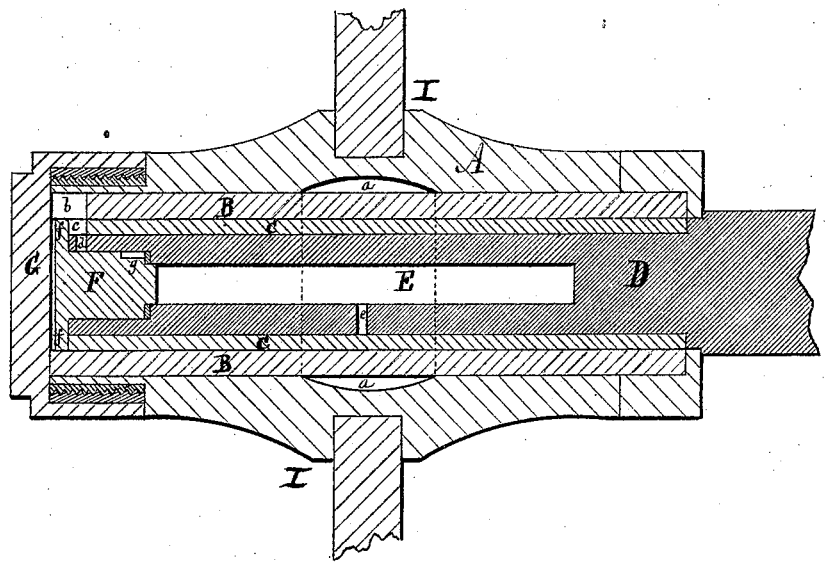
Figure 2:
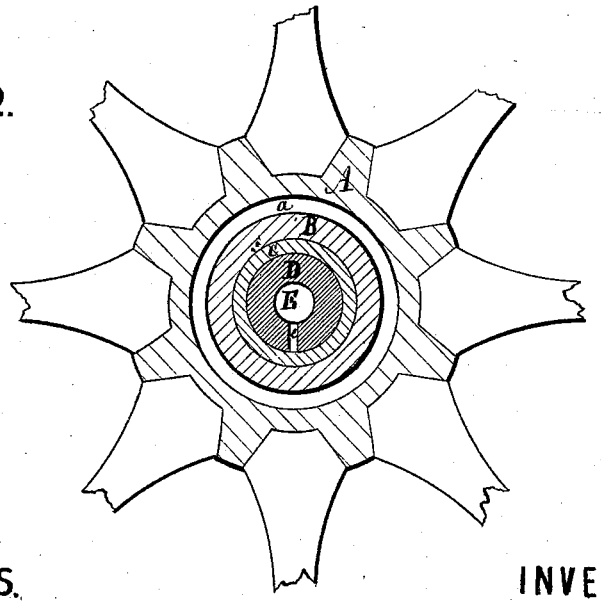

Figure 1 of the drawings is a representation of a vertical longitudinal central section of my hub. Fig. 2 is a cross-section of the same.

My invention relates to certain improvements in hubs and axles, whereby the lateral shock is lessened and the axle is kept constantly lubricated, and the oil can be replenished without removing the wheel; and it consists in a rubber lining placed between the axle-box and the bore of the hub, so that whenever a lateral shock is given to either end of the hub the rubber is compressed and forced into a recess formed in the bore, and in the devices for preventing waste of oil.

In the drawing, A represents the hub expanded in the middle, as shown at I, and in the bore of which, midway between the ends, a groove or recess, $a$, is formed, extending the entire circumference of the bore. B is a rubber lining, which may consist of a piece of tubing or a sheet of rubber, with its edges in close contact. C is a metallic box, which takes the place of the usual axle-box, and forms the bearing-surface of the hub. D is the axle, the end of which is drilled to a sufficient distance beyond the center to form an oil-receptacle, E, in the bottom of which is an orifice, $e$, in which a pin is inserted loosely so as to allow a sufficient quantity of oil to flow through the orifice to keep the bearing-surfaces properly lubricated. The outer end of the oil-chamber E is closed by a plug, F, which is screwed down into a recess in the end of the axle, having on its front end a washer or packing, by which a tight joint is formed. On the outer end of the plug F is a circular flange, $f$, which bears against the outer end of the box C, and thus secures the hub to the axle. On the upper side of the outer end of the axle is an orifice, $d$, and near the inner end of the plug F is a groove, $g$, which communicates with the orifice $d$ when the plug is inserted in the outer end of the oil-chamber without being screwed down. Immediately over the orifice $d$ a recess, $b$, is cut in the rubber tubing or lining B and another recess, $c$, in the box C. G is a cap, which is screwed down over the outer end of the hub, in the usual manner, and serves as a finish to the hub and a protection to the working-parts. When a lateral concussion is given to the hub at either end the rubber lining B is compressed toward the center, and if the force of the concussion is sufficient the rubber is pressed into the groove $a$ until it fills it, thus lessening the shock to the wheel by allowing the axle to play laterally in the hub, there being a small interval between the outer side of the plug F and the inner side of the cap G. When it is desired to replenish the oil in the chamber E, without removing the wheel, the cap G is removed and the plug F is unscrewed until the groove $g$ is immediately under the orifice $d$ and recesses $b$ $c$, so as to open communication between them and the oil-chamber E. The oil is then poured in through the recess $b$ until a sufficient quantity has entered, when the plug is screwed home and the cap replaced.

What I claim as new, and desire to secure by Letters Patent, is—

1. The plug F, having the flanges $f$ and groove $g$, communicating with the recesses $b$ $c$, in combination with the axle-spindle and axle-box, substantially as specified.

2. The hub A, having enlargement I in the middle, and having in the enlargement the groove or recess $a$ and the spoke-mortises partly through the enlargement, in combination with the rubber lining B placed between the axle-box and bore of the hub, and extending under said recess $a$, substantially as shown and described.

In testimony that I claim the above I have hereunto subscribed my name in the presence of two witnesses.

JOSEPH Q. BRYER.

Witnesses:
PHIL. C. MASI,
GEO. E. UPHAM.